Jan. 16, 1923.

W. D. LOWE.
TOOL HOLDER.
FILED FEB. 2, 1921.

1,442,079.

Inventor
Willard D. Lowe.
By C. C. Shepherd
Attorney

Patented Jan. 16, 1923.

1,442,079

UNITED STATES PATENT OFFICE.

WILLARD D. LOWE, OF COLUMBUS, OHIO.

TOOL HOLDER.

Application filed February 2, 1921. Serial No. 441,755.

*To all whom it may concern:*

Be it known that WILLARD D. LOWE, a citizen of the United States, residing at Columbus, in the county of Franklin and State of Ohio, has invented certain new and useful Improvements in Tool Holders, of which the following is a specification.

This invention relates to an improved supporting tool primarily designed for use in conjunction with an ordinary machine shop lathe for the purpose of supporting a drill or reamer in connection with the lathe so that the drill or reamer may be securely held against rotation and prevented from breaking or cracking after the same has penetrated the work through which it has been boring.

Another object of the invention consists in the provision of a tool of this character which is adapted to be removably and securely carried by the traveling tool post of a lathe and being formed at one end to produce an L shaped extremity, the said extremity being adapted to receive the offset end of a lathe dog rigidly carried adjacent to one end of a drill or reamer, the construction being such that the offset end of the dog will engage with a shoulder provided upon the L shaped extremity of the supporting tool in such manner that the rotation of the drill or reamer will be prevented, and furthermore, the said end of the tool will be so disposed as to engage with one side of the dog in order that after the drill or reamer penetrates the work upon which it is performing the drill or reamer will be maintained in supported relation in connection with the traveling carriage, and thereby prevented from rotating in conjunction with the work through which it is passed in order to overcome fracture on the part of the said drill or reamer.

For a further understanding of the invention, reference is to be had to the following description and to the accompanying drawing, in which similar characters of reference denote like and corresponding parts throughout the several views thereof.

Figure 1:
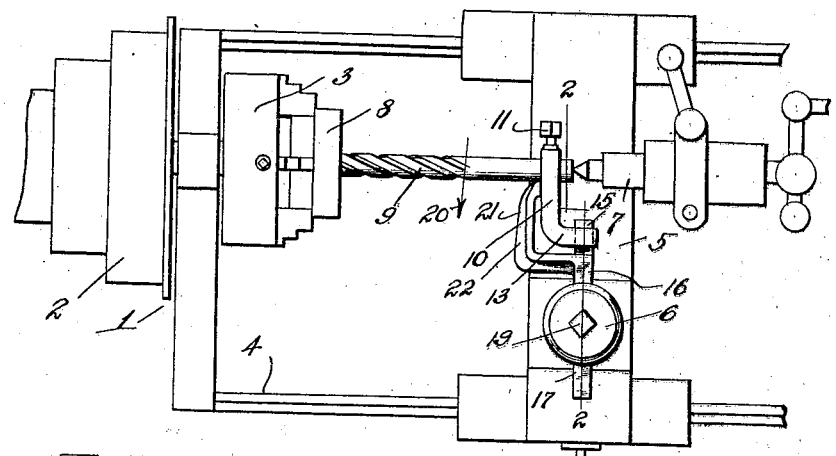
Figure 2:
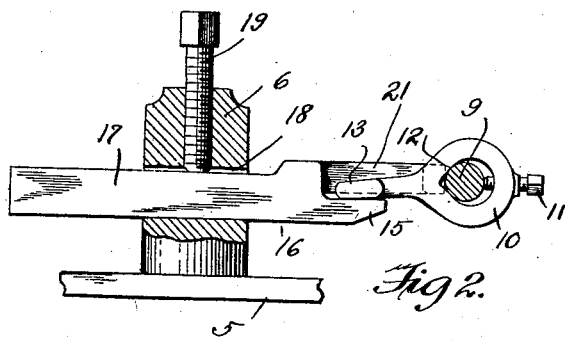
Figure 3:
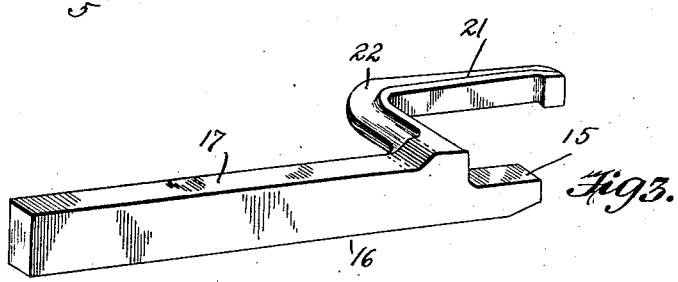

In said drawings:

Figure 1 is a top plan view disclosing fragmentarily a portion of a lathe and illustrating the application thereto of the improved supporting or holding tool comprising the present invention, Figure 2 is a sectional view taken along the line 2—2 of Figure 1, and Figure 3 is a perspective view of the supporting or holding tool.

Referring more particularly to the details of the invention, the numeral 1 designates generally an ordinary standard form of a metal working lathe, of the type commonly employed in machine shops. This lathe is of customary construction and includes the usual stepped pulleys 2, a revolving work supporting head 3, a bed 4 and a longitudinally traveling carriage 5, the latter being adapted to support for movement in unison therewith a tool post 6 and a centering spindle 7, it being understood that any suitable mechanism, common to lathes of this character, may be employed for shifting the carriage 5 and supplemental parts longitudinally of the bed 4. The head 3 is adapted to carry in any suitable manner the work to be operated upon, and in this instance a metallic disk 8 has been shown in connection therewith. To produce an axial opening within the disk, the lathe is equipped with a drill 9, the latter being supported so that its rear end will engage with the center 7 of the tail stock and its forward or cutting portions will be disposed to engage and to press into the face of the disk 8. The drill 9 is adapted to be stationarily supported, and by the rotation of the head 3 and consequently the work 8 and by the longitudinal advancement of the drill 9, effected from the tail stock, the point of the drill will be constantly forced into the work so as to produce the desired opening therein. Of course, a reamer in certain operations may be substituted for the drill.

In operations of this nature it has been a difficult matter to hold the drill against rotation and to prevent the breakage or damage of the drill and the ruin of the work upon which it is operating, after the drill has penetrated through the body of the work and produced an opening therein. Machine shops have been put to a large expense simply from the breaking of drills in operations of the above character and not only the drills have been damaged by fracture but also expensive pieces of work have been ruined and sacrificed by the breaking of the tools. The fracture of the latter has been mainly due to the insecure methods hitherto provided for the purpose of properly supporting the drills. Ordinarily a lathe operator has simply relied upon the pressure exerted by the spindle 7 longitudinally upon the drill and the engagement of the forward end of the drill with the work to maintain the drill in position. This manner of supporting a drill is practical so long as the pressure on the drill is applied, but obviously after the drill has penetrated the work the connection between the spindle 7 and the rear end of the drill is lost, and thus the drill is caused to rotate in conjunction with and to be supported by the work through which it is penetrated. When this condition exists it is very likely, and is a matter of common occurrence, that the drill will break immediately adjacent to the work, and thus the value of the drill is lost and frequently the work is marred or destroyed so that its value also is likely to be lost or diminished.

The present invention, therefore, provides a holder primarily adapted for use in conjunction with a drill or reamer situated in the position above stated and capable of cooperating with the drill and the work supporting spindle or center so that the drill will be properly supported at all times, even after penetrating the work, so that the likelihood of fracture of the drill and damage to the work will be reduced to a minimum. To this end, the rear end of the drill 9, immediately adjacent to the spindle or center 7 is equipped with a lathe dog 10 of ordinary construction, the said dog being clamped in connection with the drill by means of the ordinary set screw 11, the latter being arranged to impinge against one side of the drill so as to force the latter into engagement with the converging side walls of the opening 12 provided through the dog for the reception of the drill. The dog 10 includes, as usual, the offset extremity 13, and this extremity is adapted to engage with the upper surface of a projection 15 provided upon one end of the holding or supporting tool 16 comprising the present invention. This tool in its preferred form includes a longitudinally extending shank or body portion 17, which is adapted to be received in a transversely extending opening 18 formed in the tool post 6 and by this construction to be capable of being moved toward or away from the drill 9. The post is provided with a vertically disposed set screw 19, which is situated to engage with the upper surface of the body 17 and to thereby retain the tool in its various positions of adjustment with respect to a drill. It will be observed that the normal tendency of the drill is to rotate in the direction indicated by the arrow 20, but this tendency on the part of the drill is overcome by the lathe dog 10, which is so situated that its extremity 13 will engage the rigid projection 15 formed with the tool body, thereby serving to retain the drill in connection with the spindle 7 and to avoid rotation on the part thereof.

The tool 16 is also formed to include a substantially L shaped extremity 21, which is suitably braced and strengthened by means of a rib 22 and extends to a point immediately contiguous to the drill 9, and is disposed to engage with one side of the body of the lathe dog in such manner that undue longitudinal movement of the drill from its position of connection with the end of the center 7 will be prevented. It will be apparent that in operation the work 8 is suitably connected with the head 3, the dog 10 is then connected with one end of the drill 9, and the tail stock is moved longitudinally so that the center 7 will be brought to press against one end of said drill, the other end of said drill being pressed into engagement with the face of the work. Then, upon the rotation of the head together with the longitudinal advancement on the part of the tail stock and consequently the drill 9, the latter will be forced into cutting engagement with the work so as to produce an opening or bore therein. During the boring operation the drill is held against rotation by the engagement of the extremity 13 of the lathe dog with the projection 15, the work is thus securely supported during the boring operation. However, after the boring has been completed there is always a tendency on the part of a drill or reamer to move longitudinally away from the center 7, and to thus cause the fracture above mentioned. However, it will be observed that by the provision of the L shaped extremity 21 of the tool 16 such longitudinal movement on the part of the drill is effectively precluded and thus the shattering or breaking of the drill, from the cause mentioned, is overcome. Therefore, the present invention provides a device which is of simple construction capable of being quickly and easily applied and by its use the life of a drill or other tool is materially prolonged and the expense incident to shattered tools and destroyed work is reduced to a minimum. The tool 16 may be quickly and easily applied and will not interfere with the normal movements of the lathe operator.

What is claimed is:

1. A tool holder of the class described comprising a longitudinally extending shank capable of being detachably received within the tool post of the lathe, a rigid projection formed upon one end of said shank and adapted to cooperate with a lathe dog for the purpose of maintaining the tool carrying said dog stationary, and a substantially L shaped branch formed with said shank and cooperative with said dog for the purpose of retaining the tool against longitudinal displacement.

2. A tool holder comprising a longitudinally extending shank adapted to be mounted for transverse adjustment in the tool post of a lathe, a shoulder formed with one end of the shank portion of said holder and situated to cooperate with a drill carried lathe dog, whereby the drill will be retained against rotation, and an angular arm integrally projecting from one end of the shank portion of said holder and arranged to cooperate with said dog to maintain the drill against longitudinal displacement.

In testimony whereof I affix my signature.

WILLARD D. LOWE.